(12) United States Patent
Chwa

(10) Patent No.: US 7,320,107 B2
(45) Date of Patent: Jan. 15, 2008

(54) BOOKMARK FRAME AND METHOD OF LAUNCHING BROWSERS USING THE BOOKMARK IN AN INTERNET TERMINAL

(75) Inventor: Gyung-Yun Chwa, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 389 days.

(21) Appl. No.: 09/993,127

(22) Filed: Nov. 14, 2001

(65) Prior Publication Data

US 2002/0109714 A1 Aug. 15, 2002

(30) Foreign Application Priority Data

Feb. 10, 2001 (KR) ............... 10-2001-0006605
May 11, 2001 (KR) ............... 10-2001-0025842

(51) Int. Cl.
*G06F 3/00* (2006.01)

(52) U.S. Cl. ............... 715/738; 715/760; 715/855

(58) Field of Classification Search ............... 345/776, 345/760, 357; 713/202; 715/760, 778, 811, 715/810, 738, 854, 748, 733, 864, 847, 501.1, 715/512, 513; 709/203, 219
See application file for complete search history.

(56) References Cited

U.S. PATENT DOCUMENTS

| | | | |
|---|---|---|---|
| 6,184,886 B1 * | 2/2001 | Bates et al. ............... 345/760 |
| 6,340,980 B1 * | 1/2002 | Ho ............... 345/776 |
| 6,407,757 B1 * | 6/2002 | Ho ............... 345/776 |
| 6,544,295 B1 * | 4/2003 | Bodnar ............... 709/219 |
| 6,560,640 B2 * | 5/2003 | Smethers ............... 709/219 |
| 6,631,496 B1 * | 10/2003 | Li et al. ............... 715/501.1 |
| 6,804,704 B1 * | 10/2004 | Bates et al. ............... 709/219 X |
| 6,961,751 B1 * | 11/2005 | Bates et al. ............... 709/203 |
| 7,165,220 B1 * | 1/2007 | Bates et al. ............... 715/738 |
| 2001/0039587 A1 * | 11/2001 | Uhler et al. ............... 709/203 X |
| 2004/0075682 A1 * | 4/2004 | Burleson ............... 345/738 |

FOREIGN PATENT DOCUMENTS

| EP | 0 844 767 | 5/1998 |
|---|---|---|
| GB | 2 333 617 | 7/1999 |
| JP | 11-338810 | 12/1999 |

OTHER PUBLICATIONS

Johnny Jackson, "Windows 98 Professional Reference", Apr. 28, 1998.
Hui Guo et al., "TopicMark A Topic-focused Bookmark Service for Professional Groups", Jun. 1998.
Yoelle S. Maarek et al., "Automatically Organizing Bookmarks Per Contents", May 1996.

* cited by examiner

*Primary Examiner*—Sy D. Luu
(74) *Attorney, Agent, or Firm*—The Farrell Law Firm, PC

(57) ABSTRACT

A bookmark frame and a method of launching a plurality of browsers using the bookmark in an Internet terminal. The bookmark frame includes a browser ID field and a URL (Uniform Resource Locator) field in a 1:1 relationship corresponding to the browser ID field. To access the Internet in an Internet terminal having a plurality of browsers and using bookmarks, the bookmarks are displayed for a user to select one. The browser ID of a selected bookmark is interpreted. In accordance with the browser ID, a browser is automatically launched, the URL of the selected bookmark is interpreted, and the Internet is accessed.

10 Claims, 4 Drawing Sheets

| BROWSER ID | URL |
|---|---|

FIG. 2A

| FIELD | LENGTH(bits) |
|---|---|
| BROWSER ID | 8<br>0x00 : WAP<br>0x01 : UP<br>0x02 : HTML(C-HTML) |
| URL | 64<br>STRING WITH NULL |

FIG. 2B

BOOKMARK FRAME AND METHOD OF LAUNCHING BROWSERS USING THE BOOKMARK IN AN INTERNET TERMINAL

PRIORITY

This application claims priority to an application entitled "Bookmark Frame and Internet Using the Bookmark" filed in the Korean Industrial Property Office on Feb. 10, 2001 and assigned Serial No. 2001-6605, and to an application entitled "Bookmark Frame and Internet Using the Bookmark" filed in the Korean Industrial Property Office on May 11, 2001 and assigned Serial No. 2001-25842, the contents of both of which are hereby incorporated by reference.

BACKGROUND OF THE INVENTION

1. Field of the Invention

The present invention relates generally to a method of obtaining information from an Internet terminal, and in particular, to a bookmark frame and a method of launching a plurality of browsers using the bookmark in a terminal.

2. Description of the Related Art

An Internet terminal like a mobile phone uses a slightly compressed browser instead of a browser employed for a personal computer (PC) due to limited resources (e.g., memory, display, and communication speed). Browsers for Internet terminals may include a WAP (Wireless Application Protocol) browser, an HDML (Handheld Device Markup Language) browser, and an HTML (Hyper Text Markup Language). The WAP is the worldwide standard set for Internet browsing in a wireless terminal such as a mobile phone and a PDA (Personal Digital Assistant).

Currently, a wireless terminal is usually provided with one browser. Each browser is capable of accessing only limited sites according to corresponding gateways. In other words, all protocols cannot be interpreted with one browser. Therefore, it is necessary to determine how to launch browsers when a plurality of browsers is employed in a single terminal.

Frequently searched items can be registered in a terminal to allow a user to access information of those items by launching a corresponding browser. The structures of the frequently searched items must be defined and already defined item structures must be interpreted before the launching of the corresponding browser.

In order to search for intended information using a terminal, a browser is first launched to connect to a network and then a desired site is searched for. Therefore, the following should be considered to employ a plurality of browsers in one terminal or enable a single browser to browse adaptively in accordance with a plurality of browsing protocols (e.g., WAP, HDML, and C_HTML/HTML).

(1) Remember the protocol supporting browsing of intended information; and (2) Select a browser, connect to a network, and then browse.

Browsing a site using a selected browser to obtain intended information is not information-oriented but relates to the selection of a tool. From the user's aspect, he is inconvenienced because he must remember both a suitable browser and a corresponding site for the information.

SUMMARY OF THE INVENTION

It is, therefore, an object of the present invention to provide a bookmark frame and a method of generating and using the bookmark, which are information-oriented and thus enable an automatic selection and launching of a browser once a user selects the bookmark so that the user only has to know a corresponding URL (Uniform Resource Locator) site in order to obtain any kind of information.

The foregoing and other objects can be achieved by providing a bookmark frame and a method of launching a plurality of browsers using the bookmark in an Internet terminal. The bookmark frame includes a browser ID field and a URL (Uniform Resource Locator) field in a 1:1 relationship corresponding to the browser ID field. To access the Internet in an Internet terminal having a plurality of browsers and using bookmarks, the bookmarks are displayed for a user to select one. The browser ID of a selected bookmark is interpreted. In accordance with the browser ID, a browser is automatically launched, the URL of the selected bookmark is interpreted, and the Internet is accessed.

BRIEF DESCRIPTION OF THE DRAWINGS

The above and other objects, features and advantages of the present invention will become more apparent from the following detailed description when taken in conjunction with the accompanying drawings in which:

FIGS. 2A and 2B illustrate the structure of a bookmark frame according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

One field is added to an existing bookmark to implement the present invention. The added field is used to determine a browser type. In accordance with the present invention, when a user selects simply a bookmark from a bookmark list, a terminal automatically selects a corresponding browser and browses the intended information.

Figure 1:
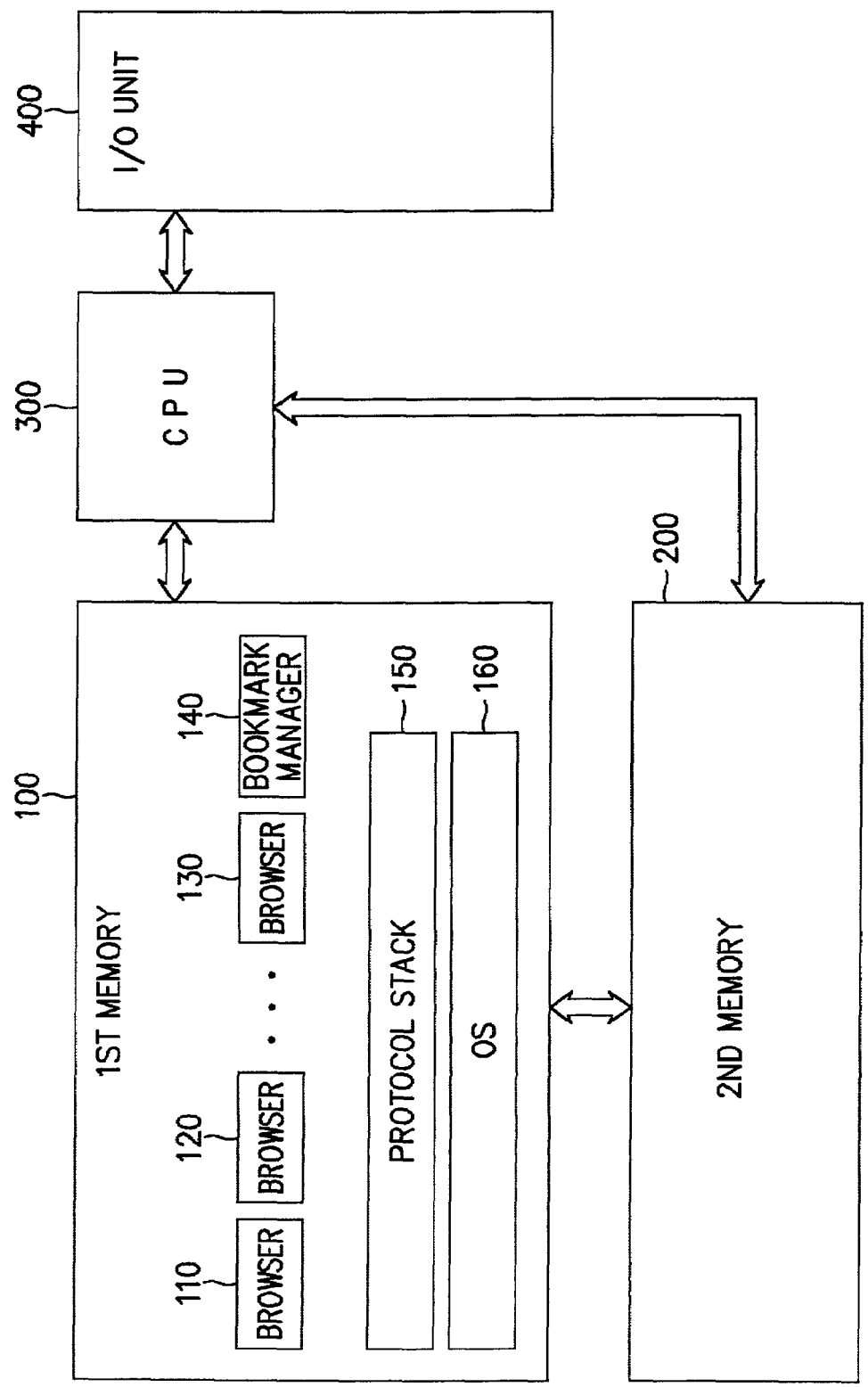
FIG. 1 is a schematic view of an Internet terminal to which the present invention is applied.

FIG. 1 is a schematic view of an Internet terminal to which the present invention is applied. Referring to FIG. 1, a first memory 100 is a memory for loading an operating system (OS) and application programs therein. The first memory 100 can be a RAM (Random Access Memory) and includes a plurality of browsers 110 to 130, a bookmark manager 140 (e.g., a program or process for reading out, analyzing, and storing bookmark information and mathematical function calls necessary for launching browsers), a protocol stack 150 and an OS 160. A second memory 200, such as a ROM (Read Only Memory), stores a program and data for controlling the overall operations of the Internet terminal. An I/O (Input/Output) unit 400 is a user interface in the Internet terminal. A controller, such as a CPU (Central Processing Unit) 300, controls the I/O unit 400 and the memories 100 and 200 such that the Internet terminal accesses the Internet and produces bookmarks.

FIGS. 2A and 2B illustrate the structure of a bookmark frame according to an embodiment of the present invention. As shown in FIGS. 2A and 2B, the bookmark frame includes a browser identification (ID) and a URL corresponding in a one to one relationship to the browser ID. The browser ID field is eight bits in length. In the present invention, it is assumed that if the ID field is 0, it indicates a WAP browser, if it is 1, it indicates a UP browser, and if it is 2, it indicates an HTML (C-HTML) browser. The URL field is a 64-bit string with null termination.

Figure 3:
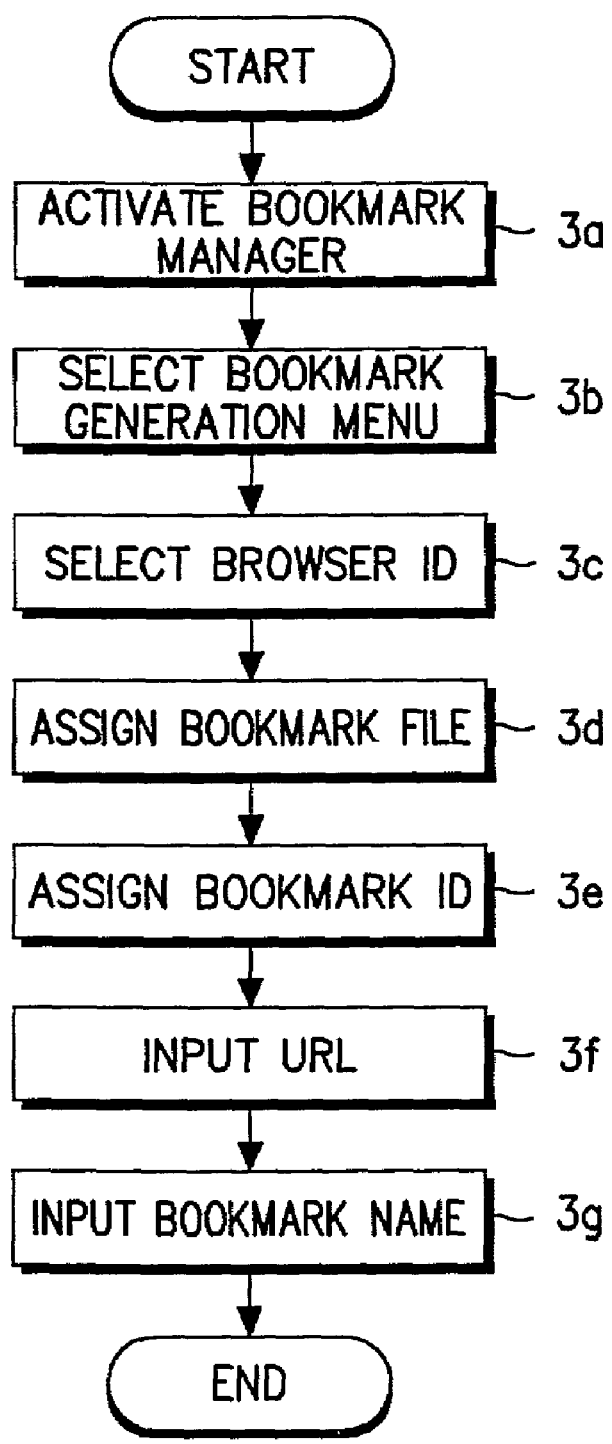
FIG. 3 is a flowchart illustrating a bookmark frame generating method according to the embodiment of the present invention.

FIG. 3 is a flowchart illustrating a bookmark frame generating method according to the embodiment of the present invention. Referring to FIG. 3, a bookmark manager, such as bookmark manager 140 of FIG. 1, is activated in step 3a. After a bookmark generation menu is selected in step 3b, one of the browsers 110 to 130 is selected in step 3c. In step 3d, a bookmark file is assigned. A corresponding ID is given to the selected browser in the bookmark file in step 3e and a URL is input in step 3f. Inputting a bookmark name in step 3g completes a bookmark.

Figure 4:
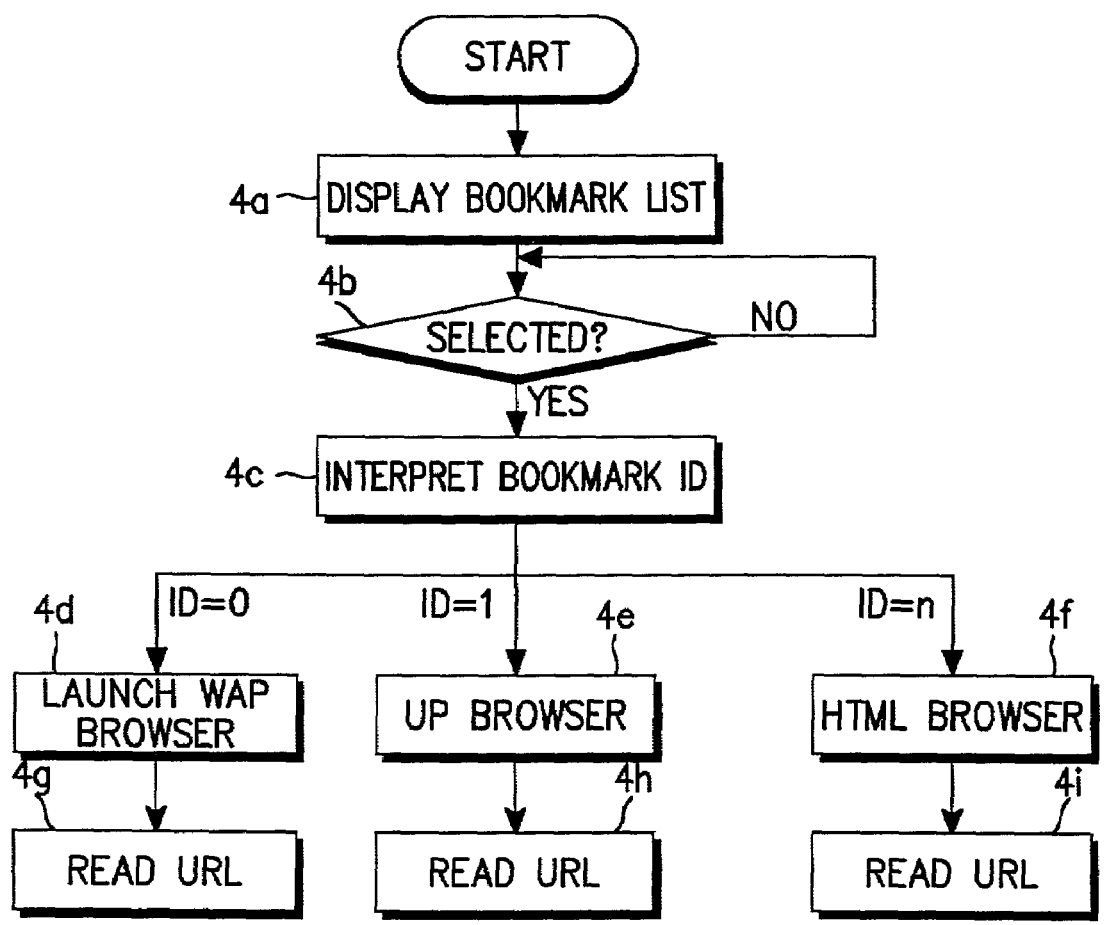
FIG. 4 is a flowchart illustrating a method of launching a plurality of browsers in an Internet terminal using bookmarks according to the embodiment of the present invention.

FIG. 4 is a flowchart illustrating a method of launching a plurality of browsers in the Internet terminal using bookmarks according to the embodiment of the present invention. In step 4a, the terminal reads a bookmark list from a memory and displays the bookmark list. The terminal checks whether a user has selected a bookmark from the bookmark list in step 4b. In step 4c, the browser ID of a selected bookmark is interpreted and a corresponding browser is launched. If the browser ID is 0, the WAP browser is launched in step 4d. If the browser ID is 1, the HDML browser is launched in step 4e. If the browser ID is 2, the HTML browser is launched in step 4f. Then, a URL is read in corresponding steps 4g, 4h, and 4i.

As described above, the present invention advantageously selects a corresponding browser and launches it automatically if a user simply selects a bookmark in the case where a plurality of browsers are provided for a terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of Internet access in an Internet terminal having a plurality of browsers, each browser having a corresponding browser ID (identifier), the method comprising the steps of:
    selecting one of a plurality of bookmarks from a bookmark list, wherein each bookmark includes a URL (Uniform Resource Locator) field for saving an address of an Internet resource and a browser ID field for saving a browser ID used to select a corresponding browser from the plurality of browsers capable of browsing the Internet resource having a unique protocol;
    interpreting a browser ID of a selected bookmark; and
    launching a browser of the plurality of browsers corresponding to the browser ID, the launched browser interpreting a URL of the selected bookmark, and accessing the Internet resource.

2. The method of claim 1, wherein the browser ID field is 8 bits.

3. The method of claim 1, wherein the URL field is 64 bits.

4. The method of claim 1, wherein the URL field is a string with null termination.

5. The method of claim 1, wherein:
    if the browser ID field is equal to a first value, a WAP (Wireless Application Protocol) browser is launched;
    if the browser ID field is equal to a second value, a UP (Unwired Planet) browser is launched; and
    if the browser ID field is equal to a third value, an HTML (Hyper Text Markup Language) browser is launched.

6. The method of claim 1, wherein the browser is a WEB browser for opening at least one file located at an address indicated by the URL (Uniform Resource Locator).

7. A bookmark frame generating method, the bookmark frame enabling a launch of one of a plurality of browsers specifically designed for a particular Internet resource having a unique protocol, the method comprising the steps of:
    activating a bookmark manager, wherein the bookmark manager is a program for reading out, analyzing, and storing bookmark information and mathematical function calls necessary for launching browsers; and
    completing a bookmark by said activated bookmark manager by:
        (a) selecting one of the plurality of browsers corresponding to the unique protocol;
        (b) assigning a bookmark file and allocating an ID (identification) corresponding to the selected browser in the assigned bookmark file; and
        (c) inputting a URL (Uniform Resource Locator) of the Internet resource having the unique protocol in the assigned bookmark file,
    wherein the bookmark file includes a first field including the ID corresponding to the selected browser and a second field located after the first field and including the URL.

8. The method of claim 7, further comprising the step of inputting a bookmark name in the assigned bookmark file after the URL inputting step.

9. The method of claim 7, further comprising the step of saving a bookmark frame including the URL of the Internet resource having the unique protocol in the assigned bookmark file and the allocated ID corresponding to the selected browser in the assigned bookmark file.

10. An apparatus for accessing the Internet using bookmarks in an Internet terminal capable of displaying bookmarks on a screen, comprising:
    a memory for storing a bookmark frame including a browser ID (identification) field and a URL (Uniform Resource Locator) field on a bookmark list, at least one browser, and a bookmark manager,
    a controller operably connected to the memory;
    a program residing on the memory and being executable by the controller to:
        select a bookmark, the bookmark including a browser ID corresponding to a particular browser, and a URL;
        launch the particular browser according to the browser ID; and,
        access the Internet according to the URL.

* * * * *